C. DE MATTIA.
TRAILER.
APPLICATION FILED DEC. 19, 1919.

1,354,175. Patented Sept. 28, 1920.

Inventor
Constant De Mattia

By S. E. Thomas
Attorney

UNITED STATES PATENT OFFICE.

CONSTANT DE MATTIA, OF DETROIT, MICHIGAN, ASSIGNOR TO WOLVERINE TRUCK-TRAILER CO., OF DETROIT, MICHIGAN, A CORPORATION OF MICHIGAN.

TRAILER.

1,354,175.      Specification of Letters Patent.      Patented Sept. 28, 1920.

Application filed December 19, 1919. Serial No. 346,092.

*To all whom it may concern:*

Be it known that I, CONSTANT DE MATTIA, citizen of the United States, residing at Detroit, county of Wayne, State of Michigan, have invented a certain new and useful Improvement in Trailers, and declare the following to be a full, clear, and exact description of the same, such as will enable others skilled in the art to which it pertains to make and use the same, reference being had to the accompanying drawings, which form a part of this specification.

My invention relates to trailers, and more particularly to means for raising, lowering, and supporting a trailer that it may be adapted for connection with a tractor.

One object of the invention is to provide a simple, strong and effective means, adapted for manual operation, for supporting the front end of the trailer and for raising and lowering the forward end of the trailer that it may be readily coupled with a tractor, the construction being such that when the trailer is coupled with the tractor, the supporting means carried by the trailer may be folded up out of the way.

Another object of the invention is to provide a device which is adapted to readily raise or lower the trailer and to support the load in any adjusted position.

With the foregoing and other objects in view which will appear as the description proceeds the invention resides in the combination and arrangement of parts and in the details of construction hereinafter described and claimed, it being understood that changes may be made in the precise embodiment of the invention herein disclosed without departing from the spirit of the same.

In the drawings accompanying this specification:—

Figure 1:
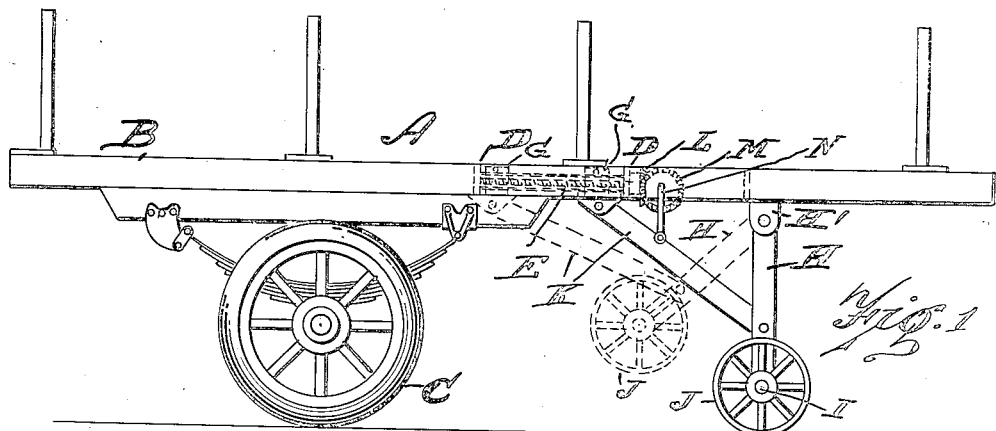
Figure 1 is a side elevation of a trailer with the device in position to support the front end of the latter, and in dotted lines its position when the trailer is coupled to a tractor.
Figures 2, 3:
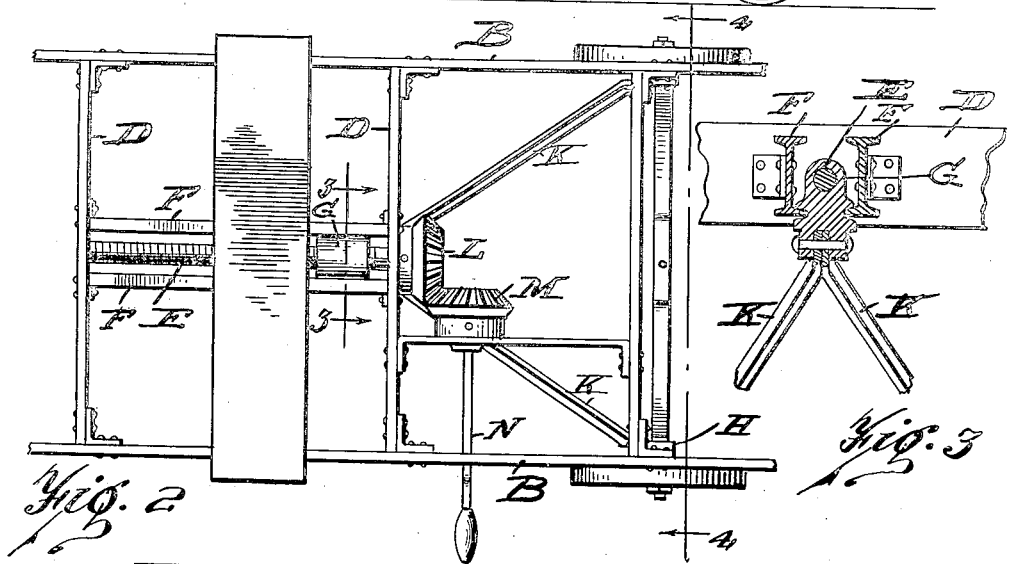
Fig. 2 is a fragmentary plan view of the trailer, and the raising and lowering means for supporting its forward end.
Fig. 3 is a sectional view on line 3—3 of Fig. 2, showing the traveling block and supporting legs connected therewith.
Figure 4:
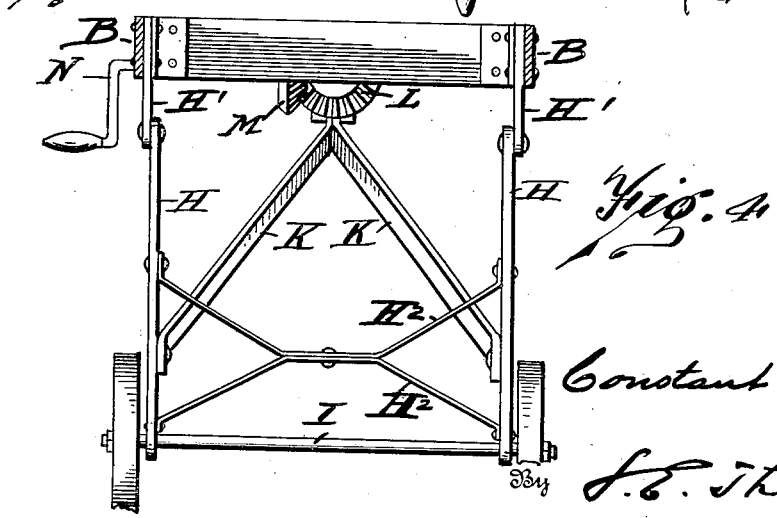
Fig. 4 is a vertical cross-sectional view on line 4—4 of Fig. 2, looking in the direction of the arrows.

Referring now to the letters of reference placed upon the drawings:—

A, denotes a trailer, B the frame of its body portion, and C its traction wheels. D, D, are two transverse members, spaced apart and bolted to the frame B. E, is a screw shaft journaled in the members D, D.

F, F, are I-beams respectively located on either side of the screw-shaft E, bolted to the members D, D.

G, indicates a traveling-block mounted upon the screw-shaft E, having grooves in its side walls to receive the flanges of the I-beams F, F, H, H, are a pair of depending legs pivoted to hangers H′ H′, bolted to the frame of the trailer.

I, indicates an axle carried by the legs H, H, on which are mounted wheels J, J. K, K are members bolted to the respective legs H, H;—bent toward each other with their abutting ends pivoted to the traveling block G. As the members K, K and legs H, H approximate a "tripod" in construction, a rigid support is provided for the forward end of the trailer which is particularly adapted for uneven road surfaces. $H^2$ $H^2$ are suitable braces or stay rods bolted to the legs H, H.

L, indicates a bevel gear secured to the end of the screw shaft E, in mesh with a like gear M, bolted to a crank shaft N, journaled in the supporting frame.

Having now indicated the several parts by reference letters the construction and operation of the device will be readily understood.

By manually operating the crank shaft N, the screw shaft E may be rotated in either direction through the action of the bevel gears L and M;—thereby causing the block G to traverse the shaft and thus raise or lower the legs H, H as may be desired.

Having thus described my invention what I claim is:—

1. In a trailer, a main frame including side members and transverse members connecting the side members, spaced I-beams connecting a pair of the transverse members and confined within the main frame, a screw shaft journaled in said pair of transverse members and located between said I-beams, a block having screw threaded connection with said screw shaft to travel on the latter and having grooves in the sides thereof to receive flanges of said I-beams whereby to guide said block, a swinging frame having pivotal connection with the main frame and with said block, and means to rotate said shaft to shift said block and therefore raise and lower said swinging frame.

2. In a trailer, a main frame, spaced flanged beams mounted on the frame, a screw shaft journaled in the frame between said beams, a block having screw threaded fit on said shaft and provided with grooves to coact with the flanges of said beams whereby to guide said block, a swinging frame carried by the main frame, a pivotal connection between the block and said swinging frame and means whereby to rotate said shaft to slide said block and thereby raise and lower the swinging frame.

3. In a trailer, a main frame, spaced flanged beams mounted on the frame, a screw shaft journaled in the frame between said beams, a block having screw threaded fit on said shaft, the beams and the block having a flange and groove connection, a swinging frame carried by the main frame, a pivotal connection between the block and said swinging frame, a beveled gear on said shaft, a crank shaft, in mesh with the gear on the screw shaft whereby upon operation of the crank shaft the block is moved along the screw shaft and the swinging frame is raised and lowered.

In testimony whereof, I sign this specification in the presence of two witnesses.

CONSTANT DE MATTIA.

Witnesses:
L. E. THOMAS,
JOHN CONSIDINE, Jr.